(12) United States Patent
Jackson et al.

(10) Patent No.: US 6,920,812 B2
(45) Date of Patent: Jul. 26, 2005

(54) CENTRIFUGAL CUTTING APPARATUS

(75) Inventors: William R. Jackson, Cicero, NY (US); Igor Korolev, Cicero, NY (US)

(73) Assignee: Eraser Company, Inc., Syracuse, NY (US)

( * ) Notice: Subject to any disclaimer, the term of this patent is extended or adjusted under 35 U.S.C. 154(b) by 24 days.

(21) Appl. No.: 10/647,860

(22) Filed: Aug. 25, 2003

(65) Prior Publication Data

US 2005/0045004 A1 Mar. 3, 2005

(51) Int. Cl.$^7$ ................................................. B23B 3/04
(52) U.S. Cl. ............................................ 82/70.2; 82/72
(58) Field of Search ............................ 82/70, 59, 63, 82/70.2, 72, 131, 140

(56) References Cited

U.S. PATENT DOCUMENTS

| | | |
|---|---|---|
| 1,306,588 A | 6/1919 | France |
| 3,129,621 A | 4/1964 | Makowski |
| 3,848,489 A * | 11/1974 | Santana ........................ 82/61 |
| 4,019,409 A | 4/1977 | McKeever |
| 4,608,755 A * | 9/1986 | Braasch ........................ 30/97 |
| 4,987,801 A | 1/1991 | Brown |
| 5,528,830 A | 6/1996 | Hansen |
| 5,609,081 A * | 3/1997 | Lin ................................ 82/59 |
| 5,669,276 A | 9/1997 | Spacek |
| 5,673,486 A | 10/1997 | Brown |
| 6,202,307 B1 * | 3/2001 | Wrate ........................ 30/101 |

* cited by examiner

Primary Examiner—Willmon Fridie, Jr.
(74) Attorney, Agent, or Firm—Wall Marjama & Bilinski LLP

(57) ABSTRACT

A multiple blade centrifugal cutting machine having a planetary gear system for coordinating the motion of the blades so that the blades move into the work at the same speed to an equal depth to either sever the work element or strip away one or more layers of coating from the core of the work element.

9 Claims, 4 Drawing Sheets

CENTRIFUGAL CUTTING APPARATUS

FIELD OF THE INVENTION

This invention relates to an improved multi-blade centrifugal cutter assembly for cutting tubular work elements and/or stripping outer coatings from core materials.

BACKGROUND OF THE INVENTION

Centrifugal cutting machines for cutting tubular stock or striping insulation from electrical wiring are relatively well known in the art. U.S. Pat. Nos. 1,306,588 and 3,129,621 illustrate some typical centrifugal cutter arrangements that are employed to cut tubular elements. Generally, a pair of straight edge blades are mounted upon an annular head that is similar to the face plate of a lathe so that the blades can swing inwardly about pivots carried in the head. A work element to be processed is introduced between the blade through an opening that passes centrally through the head and the head is then turned at a relatively high speed. A centrifugal force is generated that is sufficient to move the blades into the work element to a depth sufficient to sever the element or remove one or more outer layers from an inner core. Counter-weights are usually secured to the blades to increase the amount of force that is generated and return springs are employed to return the blades back into a home position as the centrifugal force is relieved.

The effectiveness of a multi-blade centrifugal cutter presently relies to a large extent upon the accuracy placement of the blade during the initial set up operation. The blades and associated counter weights are arranged so that the blades move into the work at the same rate of speed and penetrate into the work to the same radial depth. In the event the blade units move out of synchronization one blade will lead the other into the work and thus be required to do all the cutting while the other blade simply moves into the kerf created by the first blade. The blades can easily become misaligned after the initial set up operation whereupon, the set up operation must be repeated resulting in a good deal of expensive down time.

SUMMARY OF THE INVENTION

It is therefore a primary object of this invention to improve multiple blade centrifugal cutters.

It is a further object of the present invention to synchronize the movement of the blades of a multiple blade centrifugal cutter.

A still further object of the present invention is to lock the blades of a multiple blade centrifugal cutter together so that the blades will remain in synchronization after the initial set up operation.

Another object of the present invention is to insure that the blades of a multiple blade centrifugal cutter share the cutting load equally as the blades move into a work element.

Yet another object of the present invention is to reduce the amount of time spent in keeping the blades of a multiple blade centrifugal cutting machine in proper alignment.

These and other objects of the invention are attained by a multiple blade centrifugal cutting machine that has a support member which contains a stationary tubular hub which protrudes outwardly from the support member. A face plate is centrally mounted for rotation upon the extended section of the hub and a plurality of blade holders are in turn rotatably supported in the face plate by means of shafts that are journalled for rotation in the face plate. The shafts are all spaced an equal distance from the axis of the hub. The face plate is connected to a drive mechanism for turning the plate at a speed such that the blade holders are moved inwardly from a home position toward the center of the hub. A circular sun gear is also mounted for rotation on the outer end of the hub adjacent to the face plate. A planetary gear is secured upon the shaft of each blade holder with the planetary gears all mating with the sun gear. The work element is passed through the back of the hub and is positioned between the blades by an indexing mechanism which also serves to hold the work element in a stationary position once the element is properly positioned between the blades. Interchangeable bushings are removably contained within the hub which provide a close running fit for different size work elements to further help position a work element between the blades.

BRIEF DESCRIPTION OF THE DRAWING

For a further understanding of these and objects of the invention, reference will be made to the following detailed description of the invention which is to be read in connection with the accompanying drawing, wherein.

DETAILED DESCRIPTION OF THE INVENTION

Figure 1:
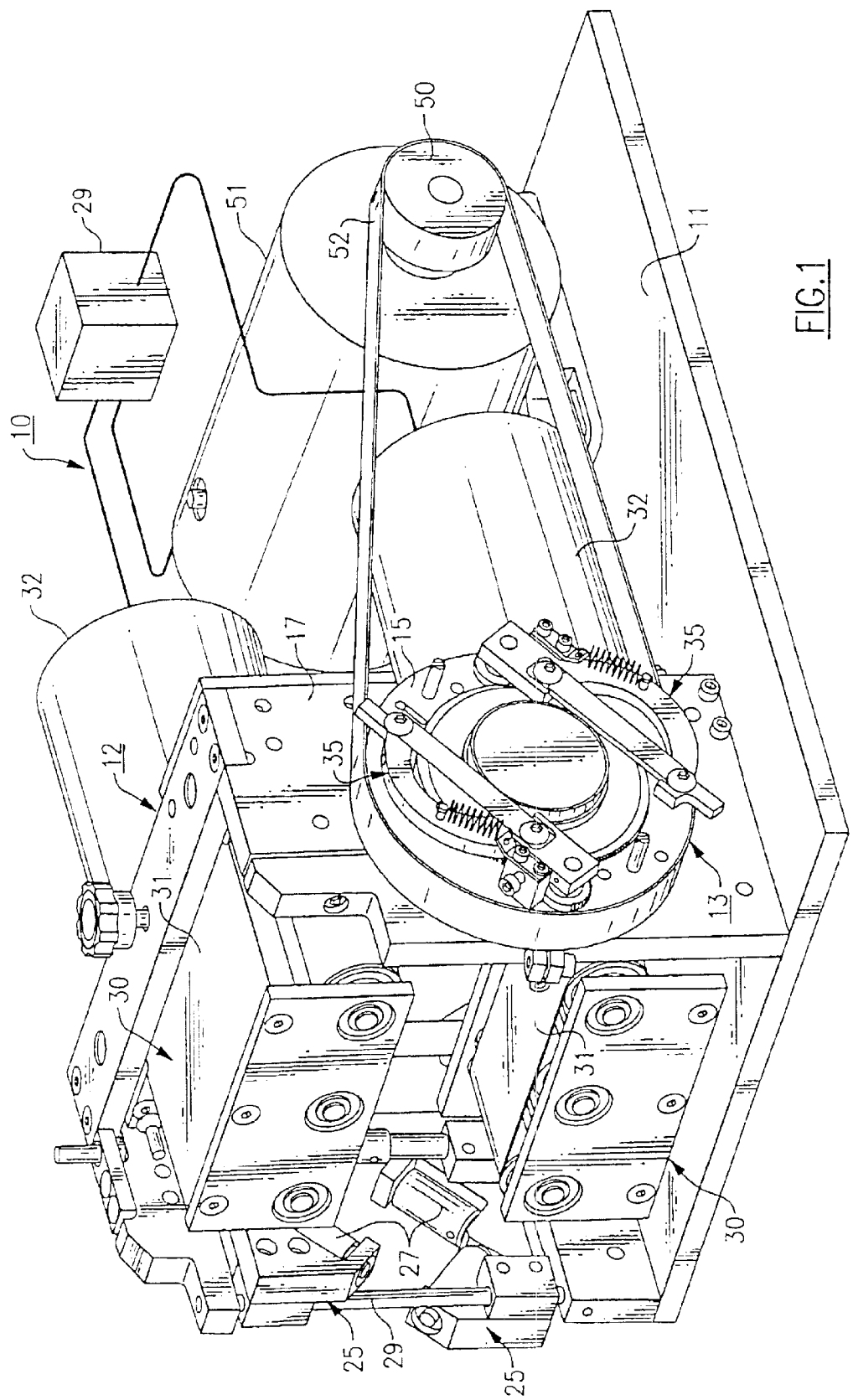
FIG. 1 is a perspective view of a multiple blade centrifugal cutting machine that embodies the teachings of the subject invention.

Referring initially to FIGS. 1–4, there is illustrated a multiple blade centrifugal cutting machine, generally referenced 10, that embodies the teachings of the present invention. The machine is shown with its outer skins removed for the sake of clarity. The component parts of the machine are mounted upon a base plate 11 and include an indexing assembly 12 and a cutter assembly 13. The cutter assembly further includes a rotatable disk which will be herein referred to as a face plate 15. The face plate is rotatably supported upon a tubular hub 16 that is stationarily anchored in a vertically disposed support member 17 which, in turn, is secured to the base plate. The hub passes through both the support member and the base plate and provides a cylindrical opening that passes through the entire cutter assembly. As will be discussed in further detail below, a work element that is being processed is guided through the back of the hub and is positioned between a pair of cutting blades 20—20 that are mounted on the face plate adjacent to the front face of the hub. A bushing 23 is replaceably mounted within the hub which provides a close running fit with the work element to insure the work element is axially aligned with the central axis 34 (FIG. 2) of the hub. Although not shown, a plurality of interchangeable bushings having varying inside diameters are available to accommodate different size work elements.

A pair of guide members 25—25 are slidably mounted on columns 26—26 in the back of the indexing assembly. Each guide member contains a pair of rollers 27 that are positioned at about a 45° angle with the vertical plane of the machine so that the roller can be moved along columns 29 into supporting contact against the work element. The guide members act in association with the bushing to guide the work element along the axis of the hub to a desired position between the cutting blades. The work element is driven through the hub by means of a pair of coacting drive belt units 30—30 that are located above and below the central axis of the hub. The belt units are adjustably mounted in the indexing assembly so that belts 31 can be brought into driving contact against the work element. Each belt unit is driven by a stepper motor 32 that are programmed by a controller 29 to index the work element between the blades so that a cut can be made in the work element at a desired location.

The blades are mounted in diametrically opposed blade holders 35—35 with each blade holder being secured at one end to a shaft 36. Each shaft, in turn, is jounalled for rotation in the face plate and the centers of the shafts are each located at an equal radial distance from the axis 34 of the hub. The shafts pass through the back of the face plate and an arcuate shaped counter weight 37 is secured to the back of each shaft by a clamp 38. Each blade is linear shaped and contains a straight cutting edge 39 that faces the axis of the hub. Each blade is secured at both ends to the associated blade holder by means of screws 39 that are threaded into the holders.

A mounting block 40 is secured to the face plate adjacent to the outer side of the blade holder by a pair of mounting screws 42. A bracket 43 is secured to the top surface of the block by the mounting screws and a spring 44 is connected at one end to the bracket. The other end of the spring is connected to a stub shaft 45 that is press fitted into the associated blade holder so as to rotate the blade holder in a counter clockwise direction. An adjustable stop 46 is threaded through the mounting block and is arranged to engage the blade holder when the holder is brought into a home position under the biasing action of the spring. When the blade holders are placed in the home position as illustrated in FIG. 2, the cutting edges of the blades are positioned to the outside of the hub thus allowing a work element to move freely through the hub.

The hub is connected to the drive pulley 50 of a variable speed motor 51 by means of an endless drive belt 52. In operation, the face plate is turned at a speed and in a direction such that the blade holders are moved by centrifugal force inwardly toward the center of the hub to produce a desired cut in a work element that has been indexed between the blades. As noted above, in most multiple blade centrifugal cutters, there is little or no effort to coordinate the motion of one blade with that of another and as a result, the blades can become misaligned and the accuracy of the cut adversely effected.

Figure 2:
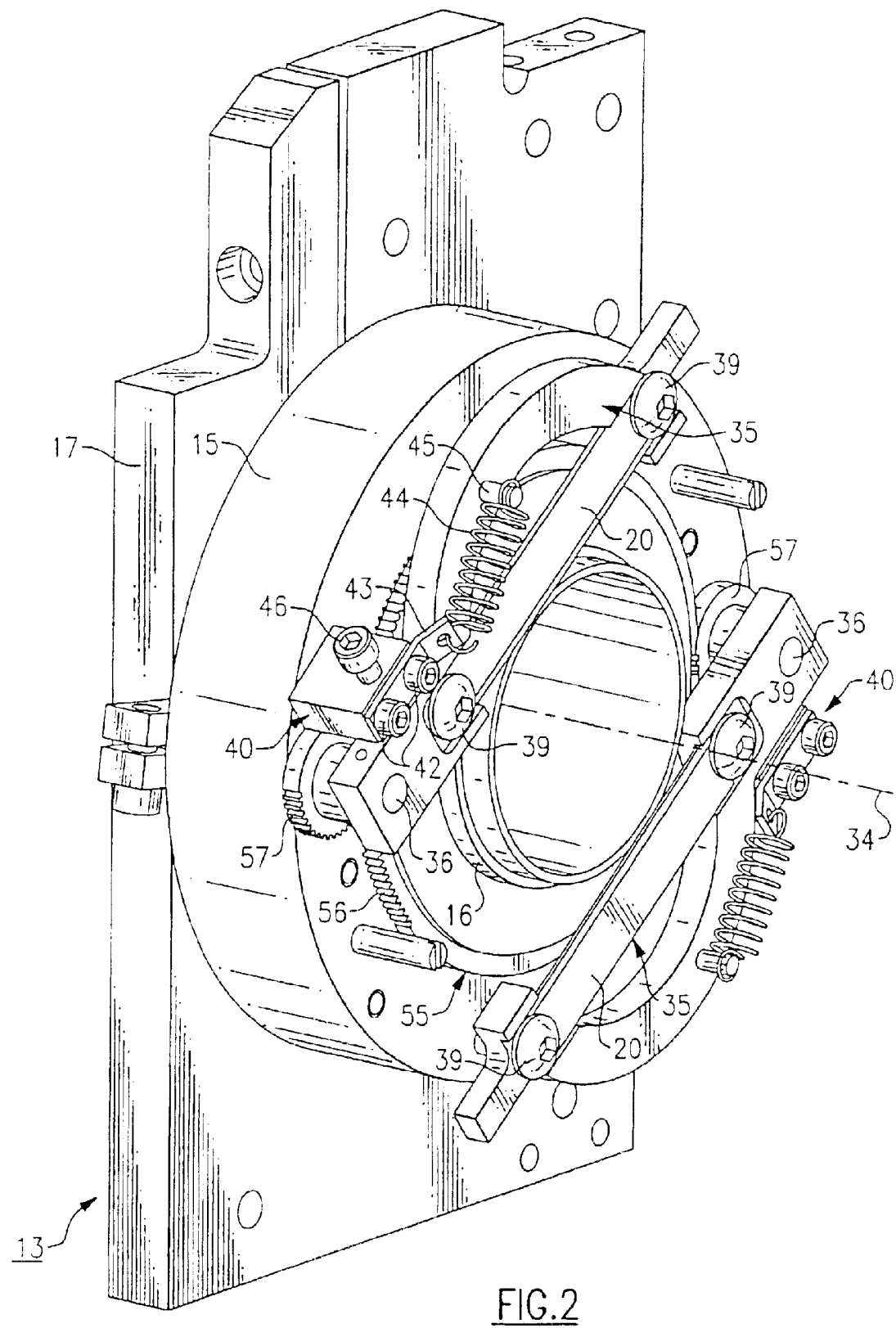
FIG. 2 is a front perspective view showing the multiple blade cutter assembly that forms a component part of the machine.
Figure 3:
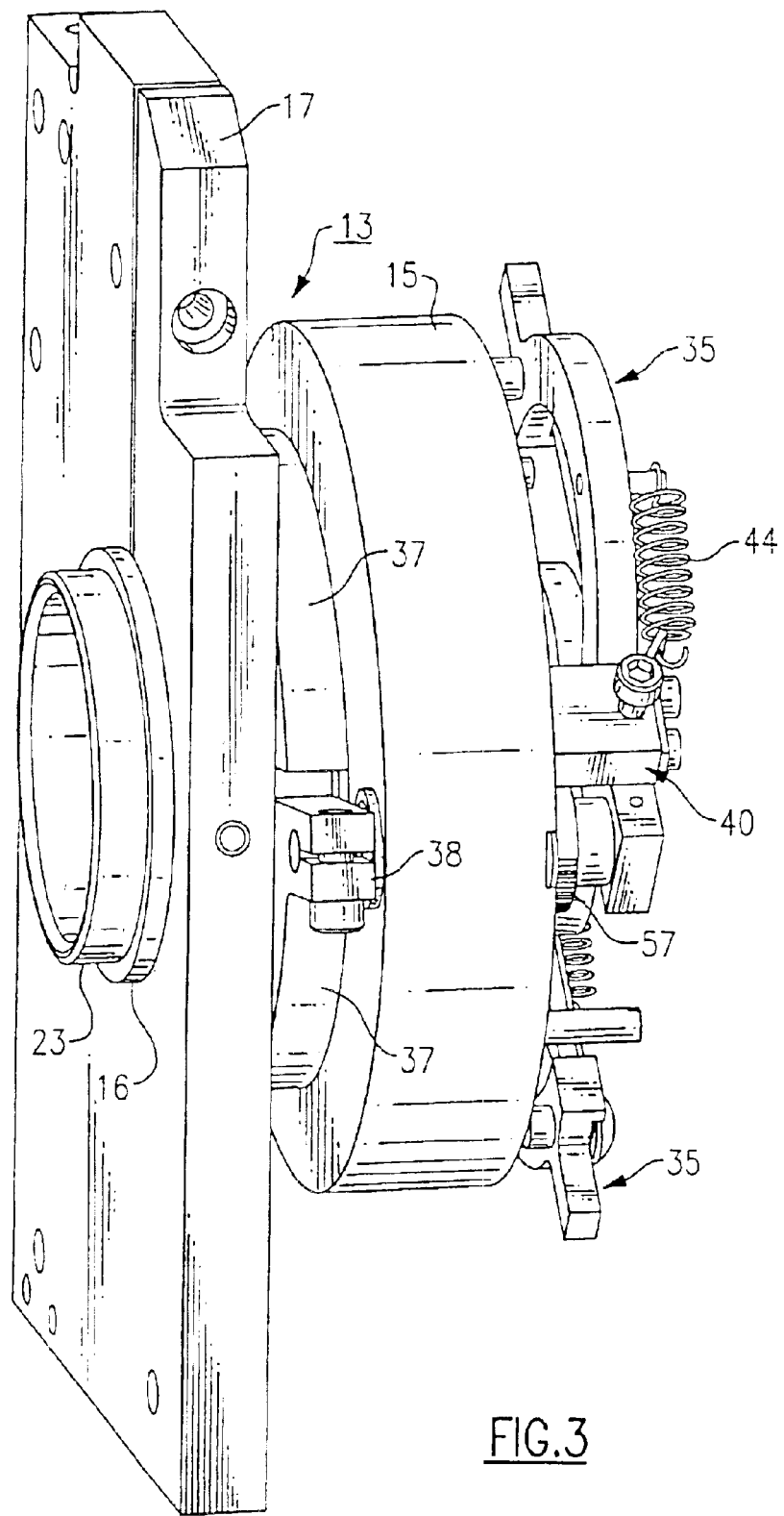
FIG. 3. is a rear perspective view of the cutter assembly illustrated in FIG. 2.
Figure 4:
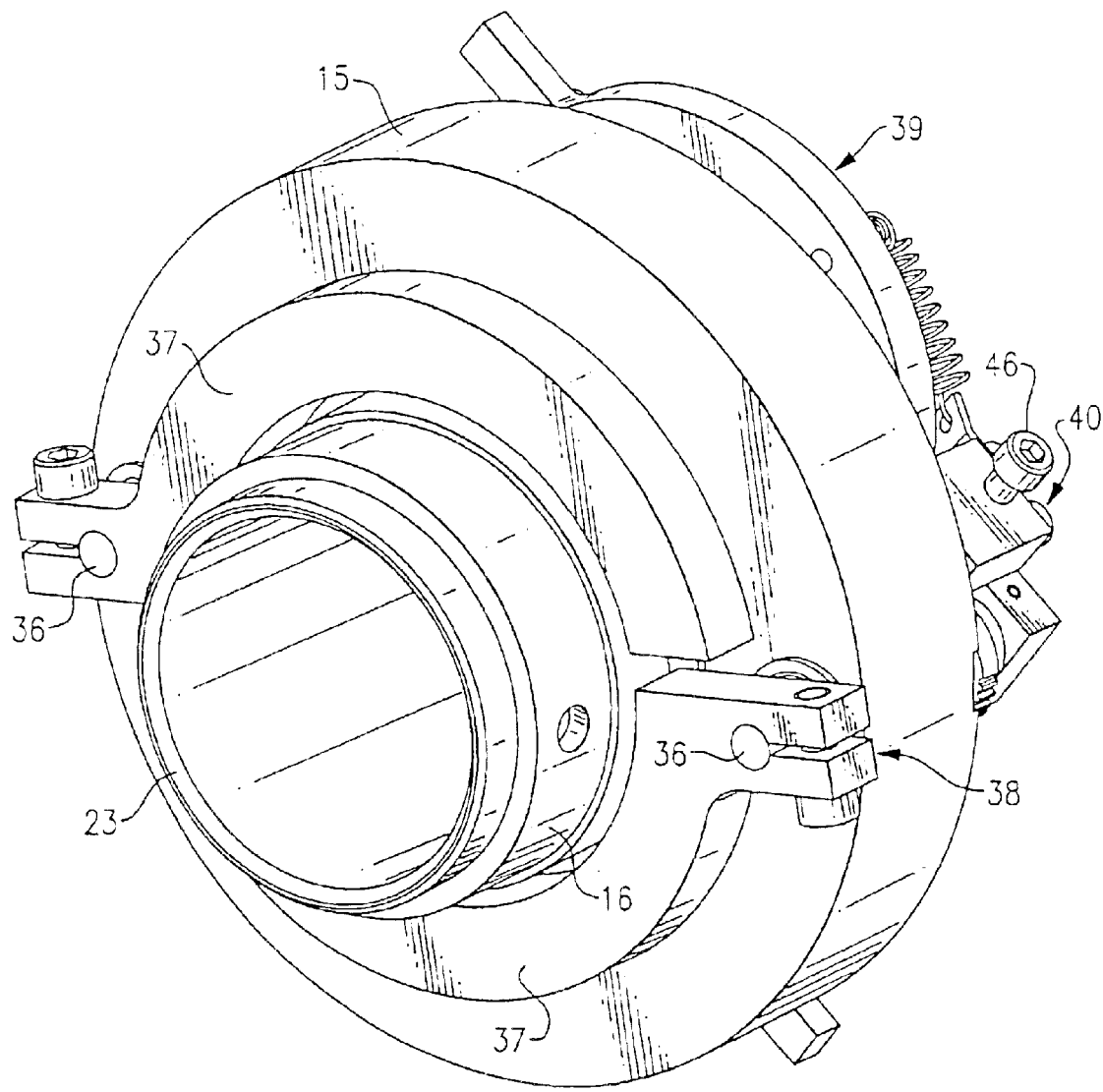
FIG. 4 is a rear view of the face plate unit that forms a part of the cutter assembly.

As best illustrated in FIG. 2, the motion of the two blade holder is coordinated through a planetary gear system generally referenced 55. The gear system includes a sun gear 56 that is mounted for rotation upon the hub immediately behind the blade holders. Identical planet gears 57 are secured to each of the blade holder support shafts 36 and are arranged to mesh with the sun gear. The motion of the two blade holder is thus coordinated through the gear train so that the blades will move at the same rate into the work. As a result, the blades share equally in the cutting action, allowing for an extremely accurate and repeatable cutting action. The depth of cut is regulated by adjusting the speed of the drive motor in response to input commands from the controller 34.

Although, the present invention has been described with specific reference to a machine utilizing two cutting blades, it should be evident that the disclosed system can be similarly employed in machines having two or more blades. In addition, it should be clear from the above disclosure that the apparatus of the present invention can be used to completely sever work elements of various materials or to strip one or more outer layers from a core without damaging the core.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A centrifugal cutting apparatus that includes:
   a stationary support member;
   a tubular hub that is stationarily mounted in the support member with a section of the hub extending outwardly from said support member;
   a face plate that is rotatably mounted on the extended section of the hub so that the face plate turns about the hub axis;
   a plurality of blade holders each of which is secured to a shaft that is journalled for rotation in an end face of said face plate, the shaft centers being spaced an equal radial distance from the axis of said hub;
   a blade having a cutting edge mounted in each holder so that the cutting edge faces the axis of said hub;
   drive means for rotating said face plate at a given speed and direction such that the blade holders are moved from a home position inwardly toward the axis of said hub by centrifugal force to bring the cutting edges of said blades into cutting contact with a work element located between said blade along the axis of said hub; and
   gear means for connecting the support shafts of said blade holders to coordinate the motion of said blade holders so that the blade holders move inwardly at the same rate when the face plate is rotated at said given speed and direction said gear means comprising a sun gear that is rotatably supported upon said hub adjacent to said one end face of said face plate and a planet gear secured to each blade holder shaft so that said planet gears mesh with said sun gear.

2. The apparatus of claim 1, wherein each blade holder includes a stop block secured to said one end face of said head for locating the blade holder in a home position and spring means for biasing said blade holder into said home position.

3. The apparatus of claim 2 that further includes adjustable means for limiting the amount of inward movement of each blade holder.

4. The apparatus of claim 1, wherein each shaft passes through an opposite end face of said face plate and a counter weight being secured to the shaft adjacent to said opposite end face.

5. The apparatus of claim 1 wherein said drive means includes a drive pulley that is secured to the output shaft of a multiple speed drive motor and an endless drive belt that is trained around the drive pulley and the face plate.

6. The apparatus of claim 5 that further includes a control means for regulating the speed of the said drive motor.

7. The apparatus of claim 1 that further includes an indexing means for advancing a work piece through said hub to position the work element between said blades.

8. The apparatus of claim 7 that further includes a removable bushing contained within said hub for guiding said work element along the axis of the hub between said blades.

9. The apparatus of claim 8 wherein the bushing has an inside diameter that forms a close running fit with the work element.

* * * * *